Patented Jan. 21, 1936

2,028,439

UNITED STATES PATENT OFFICE 2,028,439

DISAZODYESTUFFS

Heinrich Clingestein, Cologne-on-the-Rhine, and Hans Roos and Carl Heusner, Leverkusen, Germany, assignors to General Aniline Works, Inc., New York, N. Y., a corporation of Delaware No Drawing. Application July 16, 1934, Serial No. 735,540. In Germany August 15, 1933

5 Claims. (Cl. 260—44.4)

The present invention relates to new disazodyestuffs, more particularly it relates to dyestuffs which may be represented by the probable general formula:

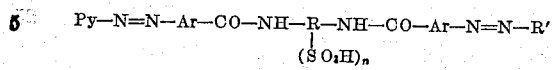

wherein Py stands for the radical of a coupling component of the pyrazolone series, such as an 1-aryl-3-methyl-5-pyrazolone which may bear substituents in the aryl nucleus, or an 1-aryl-5-pyrazolone-3-carboxylic acid or a derivative thereof, such as a carboxylic acid ester, carboxylic acid amide or a carboxylic acid aryl-amide, which 1-aryl-5-pyrazolone-3-carboxylic acids or derivatives thereof may bear substituents in the aryl nucleus or nuclei respectively, Ar stands for radicals of the benzene series, R stands for a naphthylene radical to which the NH-groups have been attached neither in ortho-position nor in peri-position, $n$ stands for the numbers one or two, and R' stands for the radical of a yellow component suitable for preparing azodyestuffs, such as a pyrazolone coupling component, phenol, phenol ether, salicylic acid, methylketole and acylacetic acid arylamides.

Our new dyestuffs are obtainable by condensing one molecular proportion of a diaminonaphthalene-mono- or disulfonic acid in which the amino groups do not stand in ortho- or peri-position to each other with two molecular proportions of nitrobenzoylchloride, reducing the nitro group, tetrazotizing the diamino compound and coupling with one molecular proportion of a pyrazolone coupling component and with one molecular proportion of a yellow component.

Further our new dyestuffs are obtainable by condensing one molecular proportion of a monoacyldiaminonaphthalene-sulfonic acid of the kind referred to with one molecular proportion of nitrobenzoylchloride, reducing the nitro group to the amino group, diazotizing, coupling with a coupling component, splitting off the acyl group by saponification in the usual manner, condensing with one molecular proportion of nitrobenzoylchloride, reducing the nitro group to the amino group, diazotizing and coupling with a yellow component, thereby selecting the coupling components in such a manner that at least one pyrazolone coupling component is present in the molecule.

In form of their alkali metal salts the new dyestuffs are generally yellow to brownish powders, dyeing the cellulosic fibre generally yellow to orange shades.

The invention is illustrated by the following examples, without being limited thereto:

Example 1.—24.9 kgs. of di-p-aminobenzoyl-2,6-diaminonaphthalene-4-sodium sulfonate are dissolved in water and tetrazotized with 7 kgs. of sodium nitrite and 28 litres of hydrochloric acid of 19.5° Bé. at 25–30° C. The tetrazo compound is introduced into a solution of 19.5 kgs. of 1-(3'-aminophenyl)-3-methyl-5-pyrazolone to which 28 kgs. of soda have been added. The diazodyestuff thus obtained which corresponds in the free state to the following formula:

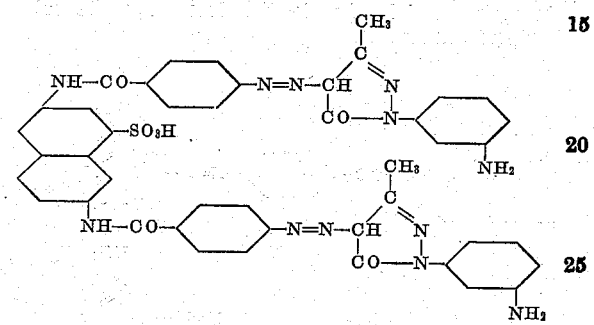

is a light yellow powder, dyeing cotton greenish-yellow shades which shades are not altered by diazotizing the dyestuff on the fibre and developing with 1-phenyl-3-methyl-5-pyrazolone. The dyeings have excellent fastness properties and can be discharged to a pure white. By diazotizing the dyestuff on the fibre and developing with β-naphthol, there is obtained a yellowish-orange of a good dischargeability.

By substituting the di-p-aminobenzoyl-2,6-diaminonaphthalene-4-sodium sulfonate by 35 kgs. of di-p-aminobenzoyl-1,5-diaminonaphthalene-3,7-disodium sulfonate, there is obtained a dyestuff having similar properties.

By substituting the 1-(3'-aminophenyl)-3-methly-5-pyrazolone by an equivalent quantity of 1-(6'-sulfo-2'-naphthyl)-5-pyrazolone-3-carboxylic acid ethyl ester of the formula:

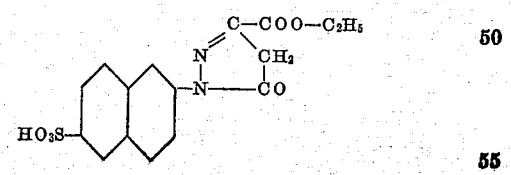

by an equivalent quantity of 1-(6'-sulfo-2'-naphthyl)-5-pyrazolone-3-carboxylic acid amide or by an equivalent quantity of 1-(6'-sulfo-2'-naphthyl)-5-pyrazolone-3-carboxylic acid anilide, there are obtained somewhat more reddish-yellow shades.

Example 2.—24.9 kgs. of di-p-aminobenzoyl-1,4-diaminonaphthalene-6-sodium sulfonate are tetrazotized as described in Example 1. The tetrazo compound is introduced into a neutral solution from 16.3 kgs. of 1-(6'-sulfo-2'-naphthyl)-3-methyl-5-pyrazolone. After one hour the coupling is complete, and after this there are introduced 9.6 kgs. of 1-(3'-aminophenyl)-3-methyl-5-pyrazolone and 28 kgs. of soda. The disazodyestuff obtained having in the free state the following formula:

saponified monoazodyestuff is filtered with suction, dissolved in water with the aid of soda to a neutral solution and condensed in soda alkaline solution with 9.3 kgs. of 4-nitrobenzoylchloride at 60–70° C. The isolated condensation product is then reduced in aqueous solution with 42 kgs. of crystallized sodium sulfide at 60° C. and then salted out by the addition of common salt and filtered. The reduced condensation product is dissolved in water and at room temperature diazotized with 28 litres of hydrochloric acid of 19.5° Bé. and 7 kgs. of sodium nitrite, and the diazo compound separated is introduced into a solution of 28 kgs. of soda and 19.5 kgs. of 1-(3'-aminophenyl)-3-methyl-5-pyrazolone. The dyestuff having in the free state the following formula:

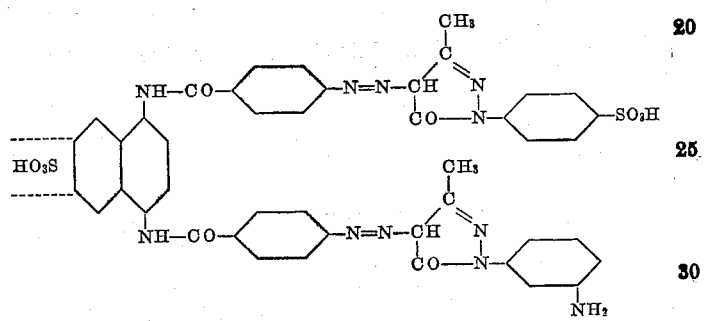

has properties similar to those of the dyestuff described in the first paragraph of Example 1.

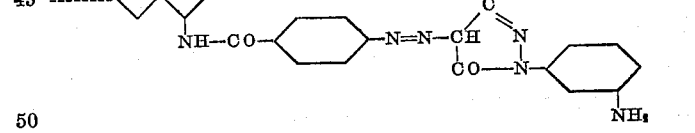

dyes cotton yellow shades of good fastness properties.

By substituting the 1-(6'-sulfo-2'-naphthyl)-3-methyl-5-pyrazolone by 13.8 kgs. of salicylic acid or by 9.3 kgs. of phenol, there are obtained dyestuffs dyeing cotton greenish-yellow shades. By after-treating with dimethylsulfate in the usual manner the dyestuff containing phenol as coupling component, there is obtained a dyestuff dyeing somewhat more greenish-yellow shades which are no longer sensitive to alkalies.

Example 3.—40.7 kgs. of 1-(4'-aminobenzoyl)-4-formyl-diaminonaphthalene-6-(or -7-) sodium sulfonate are dissolved in water and diazotized at 0° C. with 28 litres of hydrochloric acid of 19.5° Bé. and 7 kgs. of sodium nitrite. The diazo solution is then introduced into an aqueous solution of 28 kgs. of soda and 26 kgs. of 1-(4'-sulfophenyl)-3-methyl-5-pyrazolone. When the coupling is complete, the solution of the dyestuff is heated to boiling and rendered acid to Congo whereupon the formyl group is split off immediately. The By substituting the 1-(3'-aminophenyl)-3-methyl-5-pyrazolone used in the second coupling by 13.5 kgs. of methylketole, there is obtained a dyestuff exerting similar properties, or by 21 grams of acetoacetic acid-o-anisidide, there is obtained a dyestuff dyeing somewhat more greenish shades.

Example 4.—24.9 kgs. of di-4-aminobenzoyl-1,4-diaminonaphthalene-6-sodium sulfonate are tetrazotized as described in Example 1. The tetrazo solution is then introduced into an aqueous solution of 25.2 kgs. of 1-(3'-nitrophenyl)-5-pyrazolone-3-carboxylic acid to which 28 kgs. of soda have been added. The coupling is complete immediately. After some hours the reaction mixture is heated to 80° C., and an aqueous solution of 42 kgs. of crystallized sodium sulfide is slowly introduced, thereby removing the reaction heat. In order to complete the reaction the temperature is kept at 80° C. for about one hour, whereupon the dyestuff having in the free state the following formula:

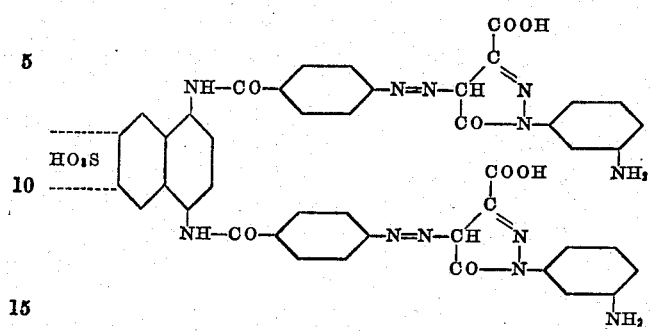

is isolated by salting out. It dyes cotton yellow shades which after diazotizing and developing with β-naphthol yield an orange, with 1-phenyl-3-methyl-5-pyrazolone a reddish-yellow. The dyeings are distinguished by an excellent dischargeability.

We claim:

1. Disazodyestuffs of the general formula:

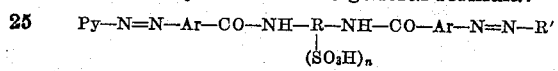

wherein Py stands for the radical of a coupling component of the pyrazolone series, Ar stand for radicals of the benzene series, R stands for a naphthylene radical to which the NH-groups are attached neither in ortho- nor in peri-position to each other, R' stands for the radical of a yellow component suitable for preparing azodyestuffs, and $n$ stands for one of the numbers one and two, dyeing the cellulosic fibre generally yellow to orange shades of good fastness properties.

2. Disazodyestuffs of the general formula:

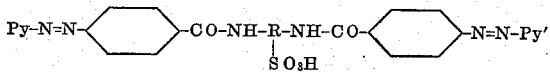

wherein Py and Py' stand for 1-aryl-pyrazolone-coupling components, and R stands for a naphthylene nucleus to which the NH-groups are attached neither in ortho- nor in peri-position to each other, dyeing the cellulosic fibre generally yellow to orange shades of good fastness properties.

3. Disazodyestuffs of the general formula:

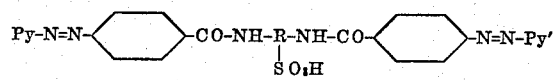

wherein Py and Py' stand for 1-phenyl-pyrazolone-coupling components in which at least one of the 1-phenyl nuclei bears an amino group and R stands for a naphthylene nucleus to which the NH-groups are attached neither in ortho- nor in peri-position to each other, dyeing the cellulosic fibre generally yellow to orange shades of good fastness properties.

4. The dyestuff having in the free state the following formula:

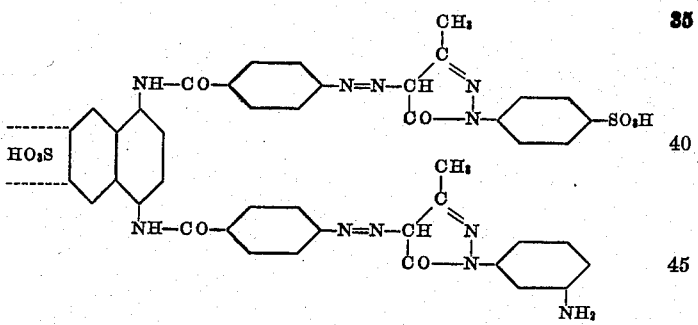

dyeing cotton greenish-yellow shades which can be discharged to a pure white.

5. The dyestuff having in the free state the following formula:

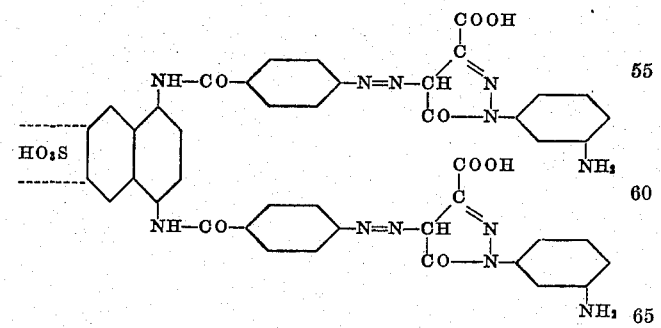

dyeing cotton yellow shades which can be discharged to a pure white.

HEINRICH CLINGESTEIN.
HANS ROOS.
CARL HEUSNER.